United States Patent [19]

Yasuda

[11] 3,832,907

[45] Sept. 3, 1974

[54] PUSHBUTTON SYSTEM TUNER

[75] Inventor: Yukitomo Yasuda, Urawa, Japan

[73] Assignee: Clarion Co., Ltd., Tokyo, Japan

[22] Filed: Mar. 21, 1972

[21] Appl. No.: 236,733

[30] Foreign Application Priority Data

| | | |
|---|---|---|
| Apr. 23, 1971 | Japan | 46-26106 |
| May 28, 1971 | Japan | 46-43308[U] |
| Sept. 2, 1971 | Japan | 46-78871[U] |
| Sept. 2, 1971 | Japan | 46-78872[U] |
| Sept. 30, 1971 | Japan | 46-88744[U] |

[52] U.S. Cl. .................................... 74/10.33, 334/7

[51] Int. Cl. .............................................. H03j 5/10

[58] Field of Search............. 74/10.33, 10.31, 10.29; 334/7

[56] References Cited

UNITED STATES PATENTS

| | | | |
|---|---|---|---|
| 3,163,837 | 12/1964 | Teaf | 334/7 |
| 3,463,017 | 8/1969 | Stamm et al. | 74/10.33 |
| 3,634,791 | 1/1972 | Yasuda et al. | 74/10.33 |
| 3,635,097 | 1/1972 | Mears, Jr. | 74/10.33 |

*Primary Examiner*—Allan D. Herrmann
*Attorney, Agent, or Firm*—William Anthony Drucker

[57] ABSTRACT

A pushbutton tuner is to provide smooth and exact tuning and channeling operations with a thin and compact mechanism, which is composed of a machine frame, coil cases furnished on said machine frame, upper plate limitedly positioned on said coil cases, moving plate and rotary frame equipped at the front side of said upper plate, a series of cores arranged on said moving plate and getting into and out respective coils in said coil cases, a series of pushbuttons having respectively arms acting on said rotary frame to move said moving plate for the coil cases, and indicator transmitting movement of said moving plate to indicate channeling conditions in the front side of the machine frame.

24 Claims, 22 Drawing Figures

PUSHBUTTON SYSTEM TUNER

BRIEF EXPLANATION OF INVENTION

Figure 1:
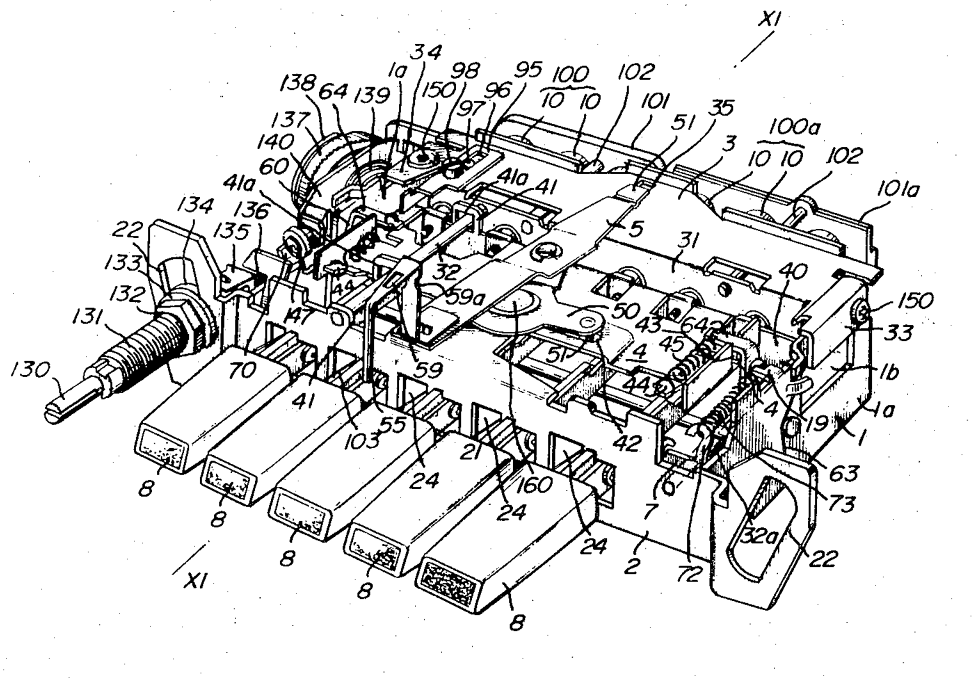

This invention relates to a new pushbutton system tuner of thinned and compact mechanism which selects channels and puts in tune smoothly and exactly, and which is manufactured, constructed or adjusted with ease.

As well known there have been in vehicles furnished pushbutton system tuners which may provide the desired channel selection and tuning condition by one-pushing.

To those conventional pushbutton system tuners such members are inevitable of a series of coil blocks, cores therefor, moving plate controlling this core, rotary frame engaged with said plate to adjust rotation and pushbuttons having a series of arm metals rotating said frame, with which the desired channel selection and tuning relationship are provided. However since this kind of prior ones are not always rational in setting-up relation of these respective members or parts, the products have been fairly bulky and have been therefore not preferable in the cases of arranging in such as the driver's narrow cabin or combination with other machinery. Further it is not easy to adjust the setting-up relation, and the performance of the product depends on the manufacturing errors or others. Careful attention and skillful technique are required therefor, and the workings are often apt to lack smoothness. In this kind of the foregoing pushbutton system tuners, the different types are necessary to adapt to such as the receiving bands of AM or FM, or to the cars to be applied with, and therefore it is necessary to prepare different members per different types, bringing about much troubles in the producing lines and storages of those different types.

The invention has been devised to remove disadvantages or defects of said prior art. The basic object of this invention is to offer a thinned pushbutton system tuner. For such a purpose the invention improves the arrangement and structure of said coil blocks, moving plate, rotary frame and pushbutton mechanism, and especially specifies the relationship of the moving plate and the rotary frame to a coil case and an upper plate. In such a manner, the invention could make satisfactorily thin and compact the pushbutton system tuner which has, in general, been inevitably bulky owing to overlapping of the rotary frame and the coil blocks, thereby enabling to provide a shape suitable for furnishing it in the narrow driver's cabin or setting it up with other machinery. Such a thin and appropriately compact tuner is possible to reduce the necessary materials economically and the weight thereof, being preferable for arrangement in cars.

Another object of the invention is to put into realization of smooth and sound channel selection and tuning. It is necessary to operate the cores for plural coils and it is never easy to cooperate all of those cores with said moving plate and rotary frame to effect sound operation by pushing of fingers. The recovering movement is necessary especially for the pushbutton, for which spring materials and the like are much arranged, and since the members are operated by fingers only against elasticities of these spring materials, apparantly it is difficult to obtain the light and secure movement. Accordingly, needless to say difficulties of the technique to provide satisfactorily this soundness by means of said thin and compact structure. The invention exactly secures such soundness and has the very high technical effect.

A further object is to get the mechanism of easy adjustment. The pushbutton system tuner is composed of said members and mechanism, and manufacting errors of them are accumulated in setting to bring about unsmoothness or other inconveniences. Especially in the miniaturized tuner, such manufacturing errors effect serious influences, and good products could not be promised. The invention is to offer a mechanism easy in adjustment without these defects, for example even after once having set up, this mechanism can be partially separated and such parts can be appropriately effected with adjustment. In this manner, the worker adjusts or amends bad conditions after having set up, so that the pushbutton system tuner can be obtained easily and exactly.

Still another object is to obtain the pushbutton system tuner which may be set up in the optional types to adapt to the receiving bands such as FM or AM, or to the cars to be applied with. As mentioned above, since the members of the conventional ones are different by the objects, the tuners are limited in its applications by the makers. The invention has cancelled such disadvantages and enables to manufacture the tuner applicable to any types with the same members. Kinds of the tuners are thereby possible to be various and moreover the members for production are simplified, so that the production management is made easy and the production could be made considerably easy.

Many other characteristics and concrete working effects will be understood by the under mentioned embodiments.

BRIEF EXPLANATION OF INVENTION

Figures 2, 3, 22:
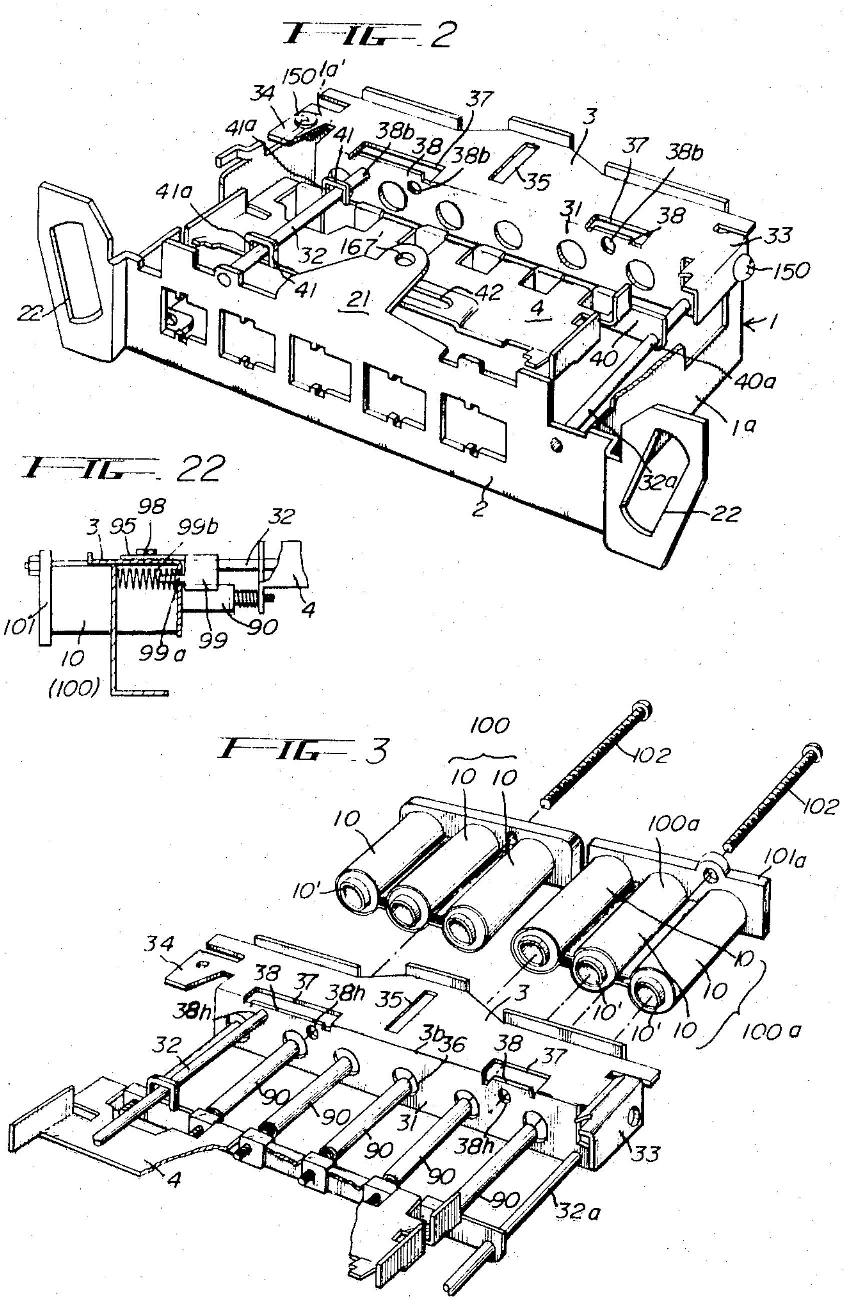
Figures 4, 5, 6, 7, 8, 12, 13, 18:
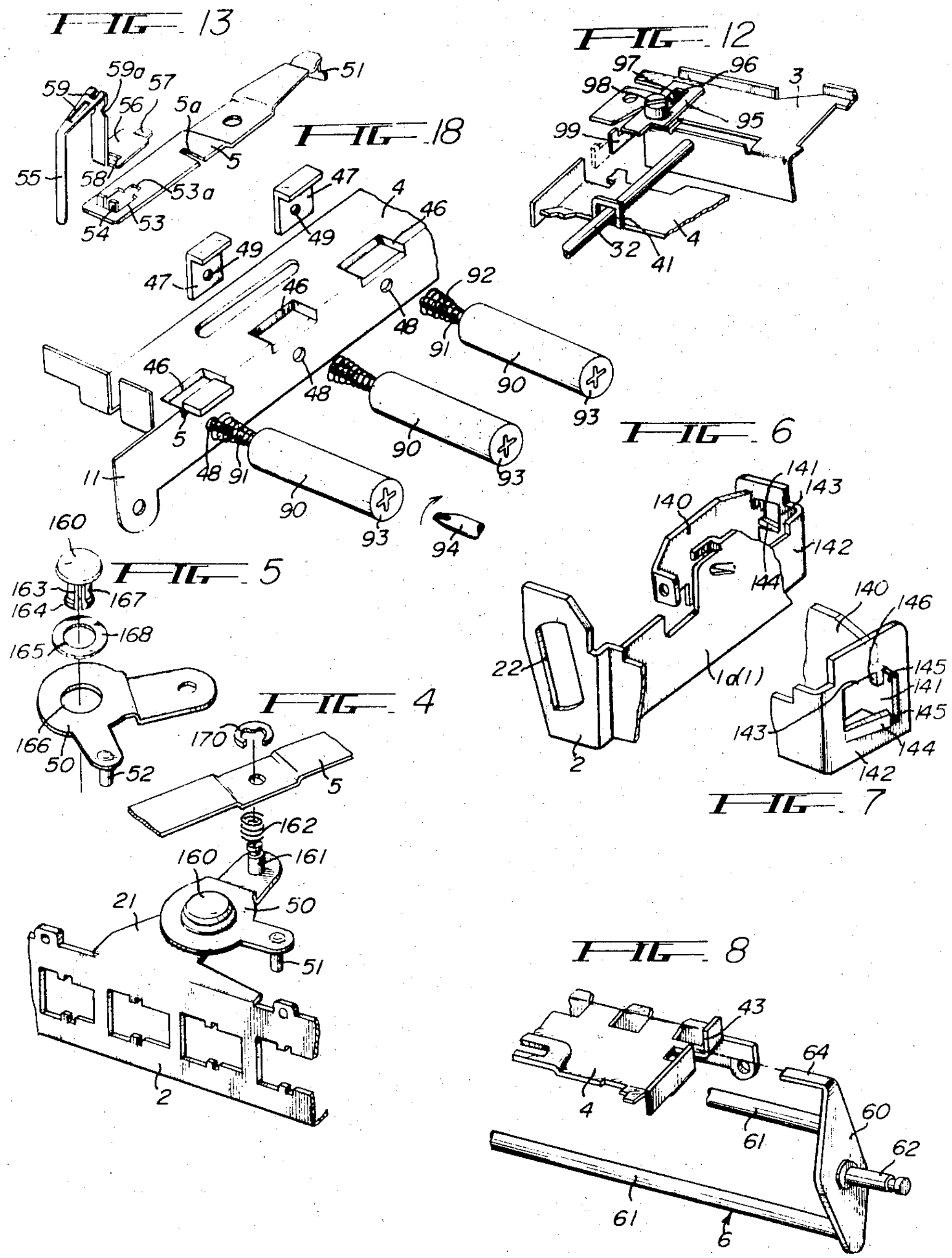
Figure 11:
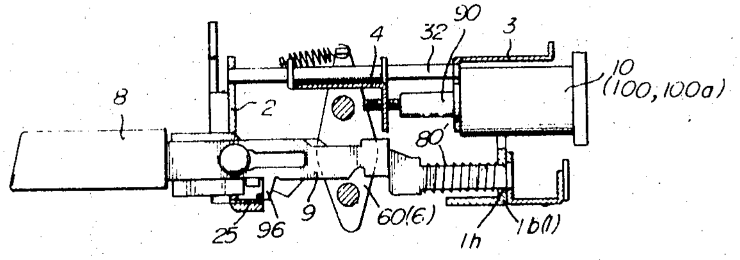
Figure 21:
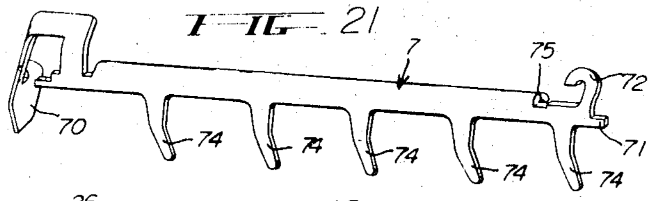
Figure 10:
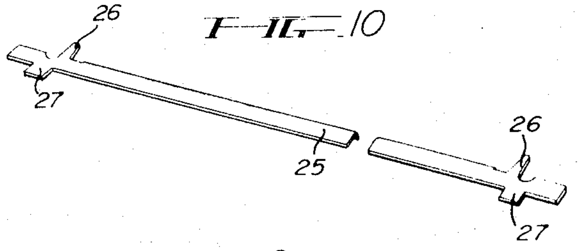
Figure 9:
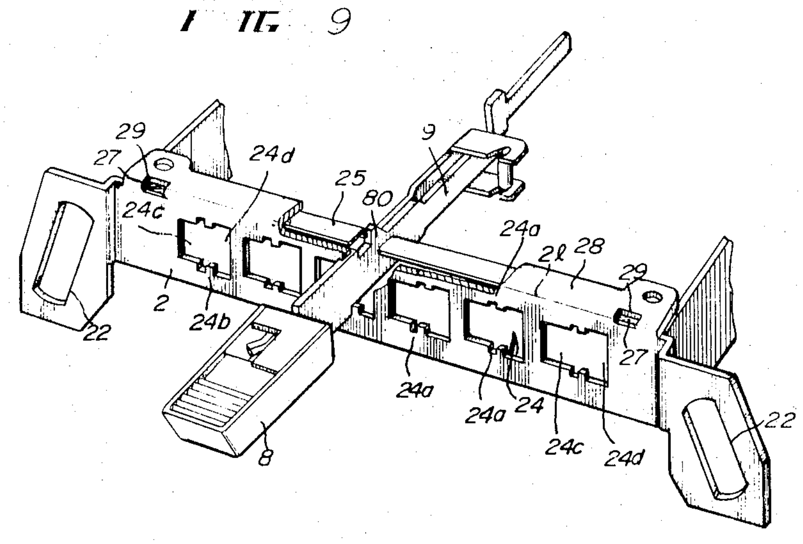
Figures 14, 15, 16, 17, 19, 20:
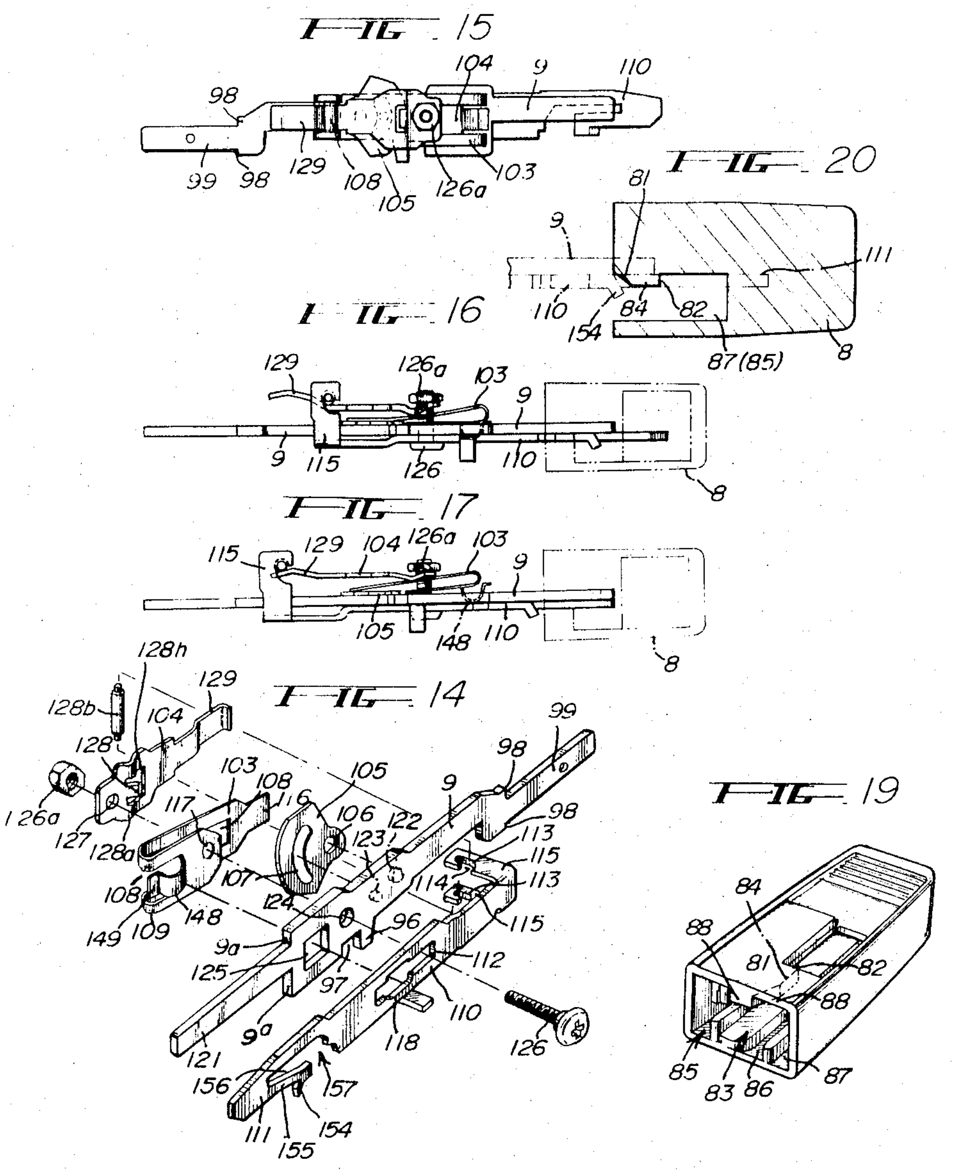

FIG. 1 shows the pushbutton system tuner of the invention the case of which is taken off, FIG. 2 is the same without pushbutton, indicator, core, moving plate and manual operating mechanism, FIG. 3 is an exploded view of the core, upper plate, moving plate and coil case, FIG. 4 is a furnishing portion of the indicator operating piece, indicator being taken off, FIG. 5 is an exploded view of the indicator operating piece and its furnishing portion, FIG. 6 shows one side of pivoting portion in a manual operating mechanism, FIG. 7 is another side of the above, FIG. 8 is an exploded view of rotary frame and moving plate, FIG. 9 shows partially in section the fitting relation of the metal arm of the pushbutton to the front plate, being from the bottom thereof, wherein one arm is shown representatively and members furnished thereon are omitted, FIG. 10 is an engaging piece arranged to the front plate, FIG. 11, is a cross section along XI — XI in FIG. 1,

FIG. 12 shows partially the furnishing condition of core stroke adjusting piece on the upper plate and the moving plate, FIG. 13 is an exploded view composing members of indicator, FIG. 14 is an exploded view composing members of arm mechanism of arm metal, sliding metal and elastic plate, FIG. 15 is a cross section of the set state of the above, FIG. 16 is a plan view showing the released condition of a channeling plate, FIG. 17 is the engaged condition of the above, FIG. 18 shows the condition of providing the cores to the moving plate, the core being removed, FIG. 19 is the rear of the pushbutton, FIG. 20 is a cross section of the pushbutton showing attachment and detachment of the arm metal therefor, FIG. 21 show the rotary piece, and FIG. 22 is a cross section of the equipping portion of the core stroke controlling piece.

DETAILED EXPLANATION OF INVENTION

To explain the pushbutton system tuner of the invention with reference to the attaching drawings, a machine frame (1) is at its front side provided with a front wall (2) and with an upper plate (3) at its upper side of the back part thereof. This upper plate 3 of the invention is limited, on at least its front side, to the upper range of a coil case 10 equipped at the rear part of the machine frame 1 and is formed with a dependent wall 31 by bending its front side at right angle. Guide shafts (32)(32*a*) are protruded to the front side from the upper plate (3, one guide shaft 32 being furnished at the relatively higher portion and another 32*a* being at the lower portion. A moving plate 4 guided by these shafts 32,32*a* is as shown in FIG. 2 positioned at the center between the shafts 32,32*a* perpendicularly, and it is engaged with the guide shaft 32 by square holes 41*a*,41*a* of projecting pieces 41,41 on the moving plate 4 and is engaged with the guide rod (32*a*) by inserting into a circular hole 40*a* formed in a dependent portion 40. Thus, the guiding is effected. The guide rod 32*a* inserted in the circular hole 40*a* leads exactly movement of the plate (4) while the guide shaft 32 in the square holes 41*a*,41*a* secures the moving directions. These guide shafts 32,32*a* exactly regulate the movement of the plate 4 at these three guiding holes 40*a*,41*a*,41*a* whereby the moving of said moving plate 4 is regulated in all directions, namely, in the width, in the vertical and in the length, and any twist force. The regulation at these three points is apparently the minimum to regulate the respective positions of the moving plate 4. The regulation by such guide shafts 32,32*a* exactly moves the plate 4, and as the connections with the guide shaft 32 are effected at points of said square holes 41*a*,41*a*, the plate 4 is moved with least friction.

In the machine frame 1, the width of its rear wall 1*b* is narrower in the height than that of side walls 1*a*,1*a* and the narrow inner rear wall 1*b* is continuous at the lower part of the side walls 1*a*,1*a*, and two coil case blocks 100,100*a* composed of more than two coil cases 10 are placed on such rear wall 1*b*. These coil cases blocks 100,100*a* are set to the upper plate 3 by that plural fixing bars 102 are equipped up and down between the dependent wall 31 and inslated end plates 101,101*a* provided to respective coil case blocks 100,100*a*. Although the coil case blocks 100,100*a* are two, they are the same as the united one and are fixed to the machine frame 1 by fixing said upper plate 3 to the machine frame 1 with stoppers 150,150 at fitting portions 33,34 in the both sides of the upper plate 3. Said fitting portion 33 is bent to be over the side wall 1*a*, and the other fitting portion 34 is as shown in FIG. 2 fit on fitting seat 1*a*′ formed by bending the upper portion of another side wall 1*a* of the frame 1, which fully contributes to the stable fitting of the upper plate 3 to the frame 1.

There is provided an indicator 5 having an indicator controlling piece 50 between said front wall 2 and upper plate 3. The indicator 5 is bent at its end portion to form an engaging portion 51 which engages a rectangular hole 35 at the center of the upper plate 3. The bell crank-like indicator controlling piece 50 whose one end is pivoted to a center of the indicator 5 is equipped by its bending through a level head pivot 160 on a fitting seat 21. A fitting shaft 52 shown in FIG. 5 fits in oblong hole 42 formed in the front side of the moving plate 4, and is projected downwards at another end of said piece 50. FIG. 4 and FIG. 5 show the actual setting-up relations of said indicator 5 and piece 50, in which a pivot 161 projected upwardly from the end of the piece 50 is furnished with a spring 162 and said indicator is positioned thereon and fastened with E-shaped stopping ring 170. The indicator controlling piece 50 is attached to said seat 21 as shown in FIG. 5 by inserting an axis 167 having a groove 163 of said pivot 160 into a hole 167′ of the seat 21 through a hole 165 of a washer 168 and a hole 166 of the piece 50, so that the piece 50 is pivotably supported. The attachments of the indicator 5 and the piece 50 denote that the stop ring 170 and pivot 160 can be voluntarily taken off as the cases may be, and that the indicator 5 and piece 50 can be thereby disassembled.

The indicator 5 has a special structure in the invention. As shown in FIG. 13, an indicating piece 55 is provided at the end of the indicator 5 attachably and detachably, for which the end of the indicator 5 is formed with a ⌂ punched hole 53 whose one side has two projections 54 by bending and another side is a portion 53*a* for a projection 57. The piece 55 to the indicator 5 is formed by shaping ], and its basic end is a part 56 whose end portion is formed with a projection 57 to be fit into said portion 53*a*, and further such a basic part 56 has narrow holes 58 for said portions 54, and still further the piece 55 has bendable portions 59*a* and bendable operating holes 59. As is seen from the above mentioned composing relationship, the projection 57 is inserted into and engaged with the portion 53*a* at its rear side, and then the narrow holes receive the two projections 54, so that the indicating piece 55 is easily combined with the indicator 5. If this combination is fixed the both projections 54,54 are bent oppositely each other. Said bendable operating holes 59 make easy the operation to appropriately amend indicating directions of the piece 55 and this operation is performed at the bendable portions 59 and also voluntarily amends the indicating directions and conditions of the indicator 5.

FIG. 3 shows the detailed structure of the upper plate 3 and the coil case blocks (100)(100*a*). Each of these blocks 100,100*a* is as well known has a coil wound on a coil bobbin (10′) therein and a sleeve around it. These coil bobbins 10′ are a little projected from the coil cases 10, and this projection is inserted into a hole 36 of the dependent part 31 of the upper plate, and accordingly regulates the relationship between the coil cases (10) and upper plate (3), the accurate setting-up position of coil cases 10 and for cores 90 may be selected. Punched holes 37 are formed along the bending line 3*b*, and projecting pieces 38,38 are formed by raising parts corresponding to said punched holes 37, and these projecting parts 38,38 are furnished with the guide shafts 32 and the fixing shafts 102,102. Formings of the punched holes 37,37 make easy the bending processes on the bending line (3*b*) to accurately form the dependent 31, and said parts 38,38 are formed with holes 38*h*,38*h*,38*h* for inserting the guide shafts 32 and the fixing shafts 102,102 thereinto so that these members may be positioned nearly to the upper plate 3. This fact actually contributes to the production of the thin tuner and concurrently gives the enough strength to the surroundings of the respective holes 38*h*.

The rotary frame 6 shown in FIG. 8 parallel to the upper plate 3 and the coil case blocks 100,100*a* is rotatably equipped between the both side walls (1*a*)(1*a*) of the machine frame 1, and has upper and lower connecting shafts 61,61 in parallel between the both side plates 60,60. Axes 62 protruded from the plates 60,60 are inserted in the side walls 1*a*,1*a* and are arranged with elastic material 63. An extending portion 64 has a special shape that it is bent inwardly and horizontally, and this horizontal extension 64 is fit in a notched portion 43 formed in the both sides of the moving plate 4. Between this extension 64 and a projection 44 at one side of the moving plate 4 there is arranged a tension spring 45 to move back and forth the moving plate 4 with rotation of the rotary frame 6 and to prevent the core 90 in the coil from rattling.

To make easy combination of the core 90 to the moving plate 4, the moving plate 4 is formed at its front part with openings 46 to adapt to the positions of the cores 90 along the bending of the moving plate 4, and these openings 46 are furnished with L-shaped fitting pieces 47, and this piece 47 has a threaded hole 49 corresponding to a hole 48 formed in the dependent wall 31, and a screw shaft 91 projecting to the axial direction of the core 90 is arranged with a conical spring 92, and the shaft 91 is screwed into the hole 49 by rotating groove 93 formed on the end of the core 90 with a rotating tool 94. Accordingly, this invention eliminates the difficulty of rotating nuts as in the known constructions, and the shaft 91 is easily screwed in the hole 49 of fitting pieces 47 and in opening 49 and fastened together.

Oblong holes 22 are formed at the both sides of the front wall 2 as shown in FIGS. 1, 2, and 9. These slant oblong holes 22,22 are inserted with a manual controlling shaft 130 and the known volume control shaft (not shown) thereinto. Being well known, the volume control shaft is not intentionally illustrated. The distances between these both shafts are different as being 124mm or 130mm due to vehicles or others to be applied with. In the symmetrically slant oblong holes 22,22, if these control shafts are set in the lower parts as shown in FIG. 1 the distance therebetween is 124mm, and reversely if set in the upper parts that is 130mm, which is apparant from the illustrated relation. As is seen from the drawing the shaft 130 and another are exactly fixed to said front wall plate 2 by means of nut 132, washer 133 and seat 134. The manual controlling shaft 130 to be rotated by a controlling member (not shown) such as nip is connected to a rotary shaft 136 having a pinion at its end, and a rotation of this shaft 136 rotates a crown gear 137, and a gear (not shown) fixed to one side of said rotary frame 6 is driven as known to rotate this frame 6, thereby moving the plate 4 to get the core 90 into or out of the coil. In this connection, a lever plate 140 which presses the crown gear to said rotary plate 138 is pressed by elasticity of a spring 139 between it and the frame 1, and this relationship between the lever plate 140 and the machine frame 1 is shown in FIG. 6 and FIG. 7. The lever plate 140 is formed at its end with a fitting portion 141, and this fitting portion 141 is engaged with opening 143 formed in holding frame (142) which is provided in the outside of the side wall 1*a*. The detailed structure of this fitting portion is that the bendable piece 144 is provided at the lower portion of said opening 143, and a fitting portion 141 is inserted in this opening 143, and stopping portions 145,145 projected at the upper and lower parts of the fitting portion 141 are engaged with a step 146 at one side of the opening (143), and then the bendable piece 144 is pushed into the opening 143 to press the lower fitting portion 145. In accordance to such an engaged structure, the bendable piece 144 is pushed out outwardly from the condition shown in FIG. 7 so that the stopping portion 145 may be released from the step and the once set lever plate 140 may be detached voluntarily and the setting-up thereof is easy. In this connection, said plate 140 is at its end equipped with a rotor 147 which faces to a fitting portion 70 of the rotary member 7, this member 7 being rotated at pushing a pushbutton.

Said rotary member 7 is as shown in FIG. 21 supported rotatably with pivot portions 71,71 on the upper parts near the front wall 2, and is formed at its one side with a hook 72 which is arranged with a tension spring 73 in relation to another hook 19 formed on the upper portion of the side wall 1*a* of the frame 1. This rotary member 7 has comb shaped projections 74 for projections formed on the side of the later mentioned sliding metal of the pushbutton 8. Further, said fitting portion 70 is suitably projected and bent to extend to the rotor 147. The upper part of the rotary member 7 is a bent part 75 except the hook 72 and the fitting 70, thereby maintaining the enough strength in the center of this rotary member 7.

There is one of the most important structure in the front wall 2. As is apparent from FIG. 9 and FIG. 10, the arm metal part of the pushbutton (8) may be extracted from the machine frame 1 and the front wall 2, and for such a purpose two holes 29,29 are formed at the both ends along a boundary bending line 2*l* of a bent part 28 on the bottom of the front wall 2 and this bent part 28 is attached with a fitting piece 25 shown in FIG. 10. This fitting piece 25 has projections (27)(27) at its both sides for mounting on said holes 29,29 and other projections 26 oppositing to the projections 27. Because of these projections 26, the fitting pieces 25 will stay in the interior of bent part 28 whenever struck by the projection 80 of arm 9. FIG. 9 shows the bottom of the front wall 2, but in the normal state the fitting piece 25 is positioned on said turned part 28. Thus, the piece 25 is always pressed to the front wall 2 by means of a fitting convex 80 formed on the bottom of the pushbutton arm, which is apparant from that this arm is arranged with spring as mentioned later.

The structure of the arm 9 relative to the piece 25 is shown in FIG. 11 and FIG. 14. The arm 9 having the pushbutton 8 at its end is as long as it just gets to an inserting hole 1*h* formed in the rear wall 1*b* of the frame (1) under the condition recovered by a spring 80′. If the arm 9 is recovered to the initial state by the elastic force of the spring so that a projection 96 at the lower portion of the arm 9 is fit in the fitting piece 25 on the bent part 28, the arm 9 is stopped in such a condition that its end portion is put in the inserting hole 1*h* only, and therefore in this condition the arm 9 does not get out from the machine frame 1 at all. When any one of the pushbuttons 8 are pushed against the spring 80′, the end of the arm 9 goes forwards than the inserting hole 1*h*, so that a channeling plate 105 controllably provided to said arm rotates and controls the rotary frame 6, and accordingly the core 90 is got into and out the coil case through the moving plate 4 and in the respective arms 9 of the not pushed pushbuttons 8 the projections 96 press the fitting pieces 25 and these pieces 25 positioned as said are not moved. If the pushbuttons 8 and arms 9 are removed for repair or adjustment all of the pushbuttons 8,8,8 . . . are pushed forwards whereby the pushing effects of the projections to the fitting pieces 25 are cancelled and the projections 27 engaged with the holes 29,29 are returned, so that the pieces 25 may be removed from the front rear (2). When the fitting piece 25 is extracted in this manner, the arm 9 is possible to be pulled to the front side within the range corresponding to at least the width of the fitting piece 25. Under the condition that the arm 9 is pulled together with the pushbutton 8, the arm 9 is released from inserting in said hole 1*h*, and as a concave 97 formed adjacent said projection 96 is positioned in an arm-insertion (24*a*) of an inserting hole 24, the arm 9 can be taken out therefrom by making use of this concave (97). The arm 9 from said hole 1*h* and the arm-insertion (24*a*) is possible to be turned laterally or slanted in said hole 24, besides as its end portion can be freely moved to right and left, the pushbutton 8 and the arm 9 provided with the later said sliding plate and others can be taken out from the machine frame 1. Not only these arm and pushbutton may be voluntarily repaired or amended but also the respective members shielded by them may be also done.

It is needless to say that said holes 24 are formed equidistantly in accordance with the numbers of the pushbuttons to be arranged. The insertion 24*a* is formed with a convex 24*b* which defines accurately the both sides of the inserted arm 9, so that the smooth sliding is lead and at least the basic sides of the arm 9 are maintained in the desired condition. Further, appropriate spaces 24*c*,24*d* permit the members thereon to be taken out as they are, and especially an elastic plate 103 stops in the space 24*d* at the time of reciprocation of the arm 9 due to the spring 80.

FIG. 14 or FIG. 17 show the detailed structure of the arm 9 and the respective members relative therewith. This structure is especially devised to exactly set or release a channeling plate 105 and provide a smooth operation thereof. A sliding metal 110 has at its end a fitting portion 111 for a pushbutton 8 and forms a rectangular hole 112 at its center in company with a slide stroke. Its end portion is horizontally bent in U-shape to provide pushing seats 115 which have up and down fitting parts 113,113 for pushing shaft 128*b* and further form openings 114, and these fitting parts 113,113 hold the center of the arm 9 therebetween. Said arm 9 provided in parallel to the sliding metal 110 forms at its end an extension (121) which goes into the pushbutton 8 together with the fitting portion 111, and has an opening 125. At the center of the arm 9, there are formed a hole 124, a pivoting convex 122 for the channeling plate 105 and a guiding convex 123 therefor, and its end part is bent downward in L-shape on which a spring receiving portion 98 is formed and its end portion is an inserting portion 99 for said inserting hole 1*h* into which a spring 80 is arranged to provide a recovering of the pushbutton. The channeling plate 105 furnished to the arm 9 is folding-fan shaped as shown. A pivoting hole 106 is mounted on the pivoting convex 122 and said guiding convex 123 is fit into an arc-shaped oblong hole 107. In this connection, a relatively strong elastic plate 104 and another relatively weak elastic plate 103 are used in order to fit the arm 9 to the channeling plate 5 or releasing it therefrom. These plates 104,103 show characteristics in the composition and structure. The weak elastic plate 103 is formed with a punched hole 108 and is turned at a turning portion 109, and its one end is formed with a check end 116 checking a pivoting hole 106 of the channeling plate 105 pivoted in the pivoting convex 122 of the arm 9 while the other end is formed with a hole 117 into which a stopper 126 is inserted through the rectangular hole 112 of the sliding metal 110 and the hole 124 of the arm metal 9. In said turned position 109 the part corresponding to said punched hole 108 is bent in U-shape to form a fitting convex 148 which has a stopping portion 149. Another plate (104) has a hole 127 into which said stopper (126) is inserted through said holes (124)117, and the thus inserted stopper 126 is screwed with a nut 126*a*. Further this plate 104 has a convex 128*a*, a punched hole 128*b* and a portion 128 pressing the channeling plate. Still further the plate 104 forms at its end a pressure part 129 in curve which receives pressure of the pressing shaft 128*b* being a rotor and rotatably inserted into said fitting parts 113,113.

The workings of members furnished on the pushbutton arm will be explained. As shown in FIG. 16, when the channeling plate 105 is released, only the check end 116 of said plate 103 presses the pivot portion 106 of the channeling plate (105), that is, as this check end 116 contacts to the top of the guiding convex 123, the channeling plate 105 is not extracted at all but is freely rotated. Especially in this condition, the fitting convex 148 of the plate 103 is dropped in an enlarged part 118 of the rectangular hole 112 of the sliding metal 110 through the opening 125 of the arm 9, and as the pushing-up force is hardly effected to the turned part 109 of the plate 103, the portion 128 does not act the pressure on the channeling plate 105. This condition may be kept even if only the sliding metal 110 goes forward a little from the state shown in FIG. 17 as is apparent from FIG. 16. Therefore, in adjusting and setting the oblique condition to the channeling plate 105 for the desired channel selection and tuning, there occurs no longer in the invention a quick tightening which has been often noted in this kind of conventional mechanism, if the sliding metal 10 is pushed forwards under the condition that the arm 9 is effected with counteractions of said pushbutton-recovering spring 90 and others. The quick tightening is such a phenominon that when the sliding metal provided on the arm is pushed forward under the condition of acting the pushbutton-recovering spring on the arm, only the sliding metal, at beginning of pushing, goes forwards slippling off the metal, so that the elastic plate arranged in the narrow range pushes the surface of the channeling plate and tightens or half-tightens it. If the channeling plate is tightened or half-tightened in such a condition, the channeling plate is, at contacting to the parallel shaft of the rotary frame, rotated and is not controlled nor set, resulting in being impossible to rotate the rotary frame and justly provide a desired adjusting and setting of the channeling plate. In other words, when the channeling plate contacts to the connecting parallel shaft 61 of the rotary frame 6, it always exactly obtains the controlling and setting suited for channeling and tuning of the channeling plate 105. From this state the fitting convex 148 is taken out the hole 112 and contacts to the inner side of the sliding metal 110 so that the turned part 109 is fully separated and pushed up. As the pressure part 129 of the strong elastic plate 104 is enough pushed by shaft 128*b* in this step, the pressing convex 128 is enough to press the channeling plate 105. That is to say, any portion of the edge of the channeling plate 105 contacts to either of the connecting parallel shafts 61,61 of said rotary frame 6, and it is possible to press to the arm 9 the channeling plate 105 which is oblique in the predetermined relationship in accordance to the position of the connecting parallel shaft 61 of the rotary frame 6, this position having been in advance decided by the manual controlling operation. Since the sharp edges of said pressing convex 128 give the exact and straight pressing action to the channeling plate 105, the stable fixing can be provided to the arm 9.

In the invention, the special device is realized in furnishing the pushbutton 8 to the end portions of said arm 9 and the sliding metal 110 as the pushbutton 8 is provided by one-pressing. This relation is shown in FIG. 19 and FIG. 20 in details, but at the outset, as is seen in FIG. 14 and FIG. 15, a fitting portion (111) at the end of the sliding metal 110 is formed with L-shaped hole 156 having a mouth 157, thereby making a contacting portion 155 with a narrow extrusion, and an inclined portion 154 is made with the basic side at the end of this contacting portion 155. With reference to FIG. 19 and FIG. 20, the pushbutton 8 which is furnished by inserting the sliding metal 110 and the tail end of the arm 9 has a cavity 85 and is provided with an oblique face 81 connecting with said contacting portion 155 and the inclined portion 154 at its inserting mouth 83, and a convex 84 forming a fitting step 82 at the inner part. The distance from the inserting mouth 83 to the fitting step 82 is the same with or a little larger than the width of said mouth. In this connection, there are formed a guiding groove 86 for a projection 121 of the arm 9 to the inmost therein, and a receiving portion 87 for the sliding metal 110. Steps 9*a*,9*a* of the arm 9 are to effect a united combination by being completely inserted to end 88 of the pushbutton 8.

The combination of the pushbutton 8 with the arm 9 and the sliding metal 110 will be explained. The V-shaped hole 156 is formed in the tail end of the sliding metal 110 whereby an elastic action may be appropriately given to at least the contacting portion 155 and the inclined portion 154 at the end of the sliding metal 110 which is rigid per se. Accordingly, when the sliding metal 110 is inserted into the pushbutton 8 from the mouth 83 together with the arm 9 in the relation of said oblique face (81) and step 82, the inclined portion 154 and the contacting portion 155 are pushed upon the oblique face 81 and convex 84, and the edge of the contacting portion 155 is engaged with the step (82) to get the preferable engaging relation by one-touching. Said L-shaped hole 156 brings about the spring-action available for the width and thickness of the sliding metal 110. The end portion of the thus inserted sliding metal 110 is automatically subjected to the shape of the receiving portion 87, and as it is inserted stably and securely thereinto, no rattling is created to provide a considerably well fitting. For decomposing such a fitting condition, the engagement of the step 82 with the contacting portion 155 may be easily cancelled by means of such as screwdriver. Since the elastic action is made use of the members are not deformed in spite of frequent attachings and detachings. The pushbutton 8 is fit and unfit with ease only by the one-pushing and straight insertion or drawing.

As shown in FIG. 1, the upper plate 2 is at its one side provided with a stroke controlling piece 95 of the core 90 to the coil case. In this kind of the tuner the available frequency bands should be set, otherwise for example the correspondence between the dial and indicator is out of order to bring about inconveniences to channeling stations. Stroke of the core decides the available frequency bands, and the conventional means for deciding the stroke regulate the moving range of the folding-fan shaped gear reciprocating the rotary frame. However such conventional ones necessitates troublesome bendings or enlarging operations by special tools or others, and the adjustments therefor are fairly difficult. Especially, in the compact devices such as in the invention, the subtle changes of the core stroke greatly influence to the frequency numbers and the controlling is delicate. Thereupon, the invention adopts said controlling piece 95, and it may be equipped on the rear side of the upper plate 3 as the cases may be. This piece 95 is formed with a rectangular hole 96 as shown in FIG. 12, and the upper plate 3 has a convex 97 engaging with this hole 96, and the piece 95 is fixed on the upper plate 3 with a stopper 98 adjacent said convex 97, and its position may be voluntal within said hole 96. The controlling piece 95 has at its side a bending portion 99, and a spring 99*b* is as shown in FIG. 22 arranged between a projection 99*a* of said bending portion 99 and the inner wall 1*b* of the machine frame 1 and accordingly the piece 95 always takes the action pushing to the front side by the spring 99*b*.

The core stroke controlling operation by the controlling piece 95 will be explained. The stopper 98 is loosened, and then the manual controlling shaft 130 is rotated as already said to approach the moving plate 4 to the coil case and contact to an extension 64 bent horizontally of the side plate 60, and subsequently the core 90 is inserted into the coil case so that the stroke between the coil-providing portion and the moving plate 4 is gradually narrowed, and the desired stroke can be obtained. When having obtained the desired stroke range, the controlling piece 95 and the upper plate 3 are fixed with the stopper 98. Unscrewing this stopper, the piece 95 is pushed out by the spring 99*b* to cancel the stroke range.

The device of this invention will be supplementally explained. As illustrated in FIG. 1, FIG. 3 and others, in the sectioned coil case blocks 100,100*a*, one 100 is for AM ban and the other 100*a* is for FM band. These coil case blocks 100,100*a* are combined with the terminal plates 101,101*a* and fixing shaft 102,102 in the similar relationship, and therefore in accordance to the tuners to be applied with either of the coil case blocks 100,100*a* is furnished. If required for the both of AM band and FM band, then the both blocks **100,100*a*** are set. The device of the invention well satisfies the various types of the tuners and does not require the special members. If parts of coils are disordered those may be exchanged with the others, and it is no longer necessary to change the whole of coils as in the whole united coil case. Further it is preferable that the antenna-guiding hole and the antenna coil are near each other, but in case the tuner for AM band is added with FM band in the production line, the conformation could be easily effected and the whole exchange as conventionally is not necessary at all.

According to the structure that the upper plate 3 is limited to the upper part of the coil case blocks **100,100*a* and the rotary frame 6 is provided to the front side of said coil case blocks, the thickness is considerably reduced in comparison with the prior ones overlapping coil cases and the rotary frame. The cooperating relations among respective members, especially that of the rotary frame 6 and the moving plate 4** are rationalized to smoothly accomplish the desired workings with the simplified structure.

Still further, according to the structure that one guiding shaft 32 is equipped at the upper portion of the moving plate 4 and the other **32*a* is at the lower portion thereof, rattlings created when the moving plate 3 is operated to the coil cases are greated decreased. In such cases that the moving plate 4 takes a certain obliquity or is going to take a certain angle and if the upper shaft is a center of this obliquity, the lower shaft checks this obliquity and vice versa, and in either way the oblique angle or moving amount are greatly lowered, thus rattling may be controlled, because the position of the both guding shafts 32,32*a* are different. The reduction of rattling makes the core 90** smoothly move and makes little disorders of frequency, while vehicles are running, to maintain the preferable tuning relationship.

I claim:

1. A pushbutton tuner, composed of a machine frame consisting of front wall, both side walls and rear wall, coil cases mounted on said machine frame, coils in said coil cases, terminal plates connected to said coil cases, an upper plate partly positioned on said cases, a plurality of guide means provided on said upper plate and protruding to the front side thereof, a moving plate sliderably mounted on said guide means, a rotary frame, and a series of pushbuttons, said rotary frame being positioned at the lower portion of said moving plate and being rotatably provided to said machine frame at the front side of said coil cases to engage with said moving plate, and said pushbutton being respectively equipped with a series of arms, channeling plates each detachably connected to one of said arms, plurality of connection parallel shafts positioned to said rotary frame, and elastic materials being arranged between the arms of said pushbuttons and said rear wall of the machine frame to always push said pushbuttons to the front side of the machine frame, said machine frame consisting of a member which is of a U-shape to provide both side walls and rear wall and consisting of the front wall at the front side thereof, said upper plate forming a dependent wall at the front side, providing a plurality of fixing means between said dependent wall and said terminal plates, and uniting with said fixing means, said coil cases to said upper plate and said upper plate to said machine frame.

2. A pushbutton toner claimed in claim 1, wherein said coil cases, each have a small projected portion, and said dependent wall has openings with said projected portions extending therein.

3. A pushbutton tuner claimed in claim 1, including extensions which are bent horizontally inwards at upper parts of the respective side plates furnished to the both sides of said rotary frame, said extensions engaging with concaves provided in both sides of said moving plate, and a tension spring positioned said extensions and said moving plate.

4. A pushbutton tuner claimed in claim 1 including punched holes provided along boundary bending line between said dependent wall and said upper plate, vertical parts corresponding to said punched holes provided on said dependent wall, and the hole to furnish guide means and insertion holes to insert the fixing means into said vertical parts.

5. A pushbutton tuner claimed in claim 1 including setting seats provided in said frame at both sides thereof, setting oblong holes which are symmetrically obique in said setting seats, and manual controlling means and volume controlling means, the positions of both means being set along said setting holes to adapt to the distance therebetween according to the distance in vehicles to be applied with the tuner.

6. A pushbutton tuner claimes in claim 1 including one end of a lever plate positioned in a setting seat at one side of said machine frame, a spring positioned between said lever plate and said machine frame, a crown gear, a manual controlling shaft operatively connected to said crown gear, rotary plate having a friction material positioned for contact with said crown gear for moving obliquely said rotary frame by rotation of said rotary plate to operate said moving plate having said core, and a pivot for fitting seat of said lever plate into opening on said fitting seat.

7. A pushbutton tuner, comprising a machine frame consisting of four side walls, coil cases mounted on said machine frame, coils in said coil cases, an upper plate on said coil cases, two guide means between said upper plate and the front wall, of said machine frame, a moving plate slidably mounted along said guide means, a rotary frame engaging with said moving plate, and a series of pushbuttons equipped with a series of arms channeling plates detachably connected to said arm, said pushbuttons being arranged at the front wall of said machine frame, elastic material between the arms of said pushbutton and the inner wall of said machine frame, thereby maintaining the condition that said pushbuttons are always pushed to the front of said machine frame, said machine frame consisting of a member which is of a U-shape to provide both side walls and rear wall and consisting of the front wall furnished at the front side thereof, said upper plate forming a dependent wall at the front side, providing a plurality of fixing means between said dependent wall and terminal plates equipped to said coil cases, and uniting, with said fixing means, said coil cases to said upper plate and said upper plate to said machine frame, and any one of said two guide means are positioned on the upper plate of said moving plate and the other guide means is at the lower position of said upper plate.

8. A pushbutton tuner claimed in claim 7 wherein said moving plate is slidably engaged with said two guide means in such a manner that one is inserted in square holes and the other is in circular holes, and said moving plate is slidably engaged with said two guide means in such a manner that one is inserted in said square holes and the other is in the only one in said circular hole.

9. A pushbutton tuner, comprising a machine frame consisting of four side walls, coil cases mounted on said machine frame, coils in said coil cases, an upper plate on said coil cases, two guide means between said upper plate and the front wall of said machine frame, a moving plate slidably mounted along said guide means, a rotary frame engaging with said moving plate, and a series of pushbuttons equipped with a series of arms, channeling plates detachably connected to said arms, said pushbuttons being arranged at the front wall of said machine frame, an elastic material positioned between the arms of said pushbuttons and the inner wall of said machine frame, thereby maintaining the condition that said pushbuttons are always pushed to the front of said machine frame, said machine frame consisting of a member which is of a U-shape to provide both side walls and rear wall and consisting of the front wall furnished at the front side thereof, said upper plate forming a dependent wall at the front side, providing a plurality of fixing means between said dependent wall and terminal plates equipped to said coil cases, and uniting, with said fixing means, said coil cases to said upper plate and said inner plate to said machine frame and an indicator is positioned in an oblong hole of said upper plate, and a bell crank shaped indicating piece having one end pivoted in the center of said indicating piece and provided in the fitting seat on the upper part of said front wall with a pivot, a fitting shaft projecting from the upper portion of said front wall fits in a hole laterally provided in said moving plate, and a groove is formed in an axis mounting on the indicating piece for said fitting seat whose end portion has a flange fitting said pivot.

10. A pushbutton tuner, comprising a machine frame consisting of four side walls, coil cases mounted on said machine frame, coils in said coil case an upper plate on said case, two guide means between said upper plate and the wall of said machine frame, a moving plate slideably mounted along said guide means, a rotary frame engaged with said moving plate, and a series of pushbuttons equipped with a series of arms, channeling plates detachably connected to said arms, said pushbuttons being arranged at the front wall of said machine frame, an elastic material positioned between the arms of these pushbuttons and the inner wall of said machine frame maintaining the condition that said pushbuttons are always pushed to the front of said machine frame, said machine frame consisting of a member which is of a U-shape to provide both side walls and rear wall and consisting of the front wall furnished at the front side thereof, said upper plate forming a dependent wall at the front side, providing a plurality of fixing means between said dependent wall and terminal plates equipped to said coil cases, and uniting, with said fixing means, said coil cases to said upper plates and said upper plate to said machine frame, and a convex is inserted in a hole of said indicator, a shaped hole in the end portion of said indicating pieces providing two bent projects at one side of said hole, forming a concave step at the other side, forming a basic portion covering said hole on the basic end portion of said indicator providing a projection at a lower portion to engage with said concave step on the point thereof, and forming a narrow groove to receive said projection therein, and a bent operating portion in said indicator.

11. A pushbutton tuner, comprising a machine frame consisting of four side walls, coil cases mounted on said frame, coils in said cases, an upper plate on said coil cases, two guide means between said upper plate and the front wall of said machine frame, a moving plate slidably mounted along said guide means, a rotary frame engaged with said moving plate, and a series of pushbuttons equipped with a series of arms, channeling plates detachably connected to said arms, said pushbuttons being arranged at the front wall of said machine frame, an elastic material positioned between the arms of said pushbuttons and the inner wall of said machine frame, thereby maintaining the condition that said pushbuttons are always pushed to the front of said machine frame, said machine frame consisting of a member which is of a U-shape to provide both side walls and rear wall and consisting of the front wall furnished at the front side thereof, said upper plate forming a dependent wall at the front side, providing a plurality of fixing means between said dependent wall and terminal plates equipped to said coil cases, and uniting, with said fixing means, said coil cases to said upper plate and said upper plate to said machine frame, openings are formed to the front of said moving plate to the positions of said cores, L-shaped fitting pieces are positioned in said openings, and said fitting pieces are formed with screw holes corresponding to holes in the dependent wall, screw means projected along the axial direction of the core are screwed into said screw holes and on which grooves for a screw driver are formed.

12. A pushbutton tuner, comprising a machine frame consisting of four side walls, coil cases mounted on said machine frame, coil in said coil cases, an upper plate limitedly positioned on said cases plate guide means between said coil case and said machine frame, a moving plate slidably mounted along said guide means, a rotary frame engaged with said plate, and a series of arms, channeling plates detachably connected to said arms and said rotary frame, a series of pushbuttons on said arms positioned on the front of said machine frame, and said coil cases consisting of plural united coil case blocks which are furnished with terminal plates respectively said terminal plates are machine frame being combineded exchangeably, attachably and detachably with combining means which is placed at the same position therewith, said machine frame consisting of a member which is of a U-shape to provide both side walls and rear wall and consisting of the front wall furnished at the front side, thereof providing a plurality of fixing means between dependent wall and terminal plates equipped to said coil cases, and uniting, with said fixing means, said coil cases to said upper plate and said upper plate to said machine frame.

13. A pushbutton tuner, comprising a machine frame consisting of four side walls, coil cases mounted on said machine frame, coils in said cases, an upper plate on said coil cases, two guide means positioned between said upper plate and the front wall of said machine frame, a moving plate slidably mounted along said guide means, a rotary frame engaged with said moving plate, and a series of pushbuttons equipped with a series of arms, channeling plates detachably connected to said arms and said rotary frame, said pushbuttons being arranged at the front wall of said machine frame, an elastic material positioned between the arms of said pushbuttons and the rear wall of said machine frame, thereby maintaining the conditioned that said pushbuttons are always pushed to the front of said machine frame, said machine frame consisting of a member which is of a U-shape to provide both side walls and rear wall and consisting of the front wall furnished at the front side thereof, said upper plate forming a dependent wall at the front side, providing a plurality of fixing means between said dependent wall and terminal plates equipped to said coil cases, and uniting with said fixing means, said coil cases to said upper plate and said upper plate to said machine frame, forming holes along the bent boundry line relative to turned part formed at the bottom of said front wall, fitting pieces having convexes detachably mounted in said holes on said turned part, and forming projections for fitting pieces on said arms so that said arms are always pushed to said front plate by the recovering force acting thereof, and said arms being so long so that the end portion of each arm is inserted in only an insertion hole of the rear wall of said machine frame by elasticity of said spring between said arm and said rear wall.

14. A pushbutton tuner claimed in claim 13 a concave adjacent said fitting projection in the wide part of said arm whereby front wall can be dropped into said concave by removing said fitting piece and taking out said arm, thereby releasing said arm from engaging condition with the fitting portion of said arm.

15. A pushbutton tuner, comprising a machine frame consisting of four side walls, coil cases mounted on said machine frame, coils in said coil cases, a plurality of guide means for said coil cases, a moving plate slideably mounted on said guide means for being moved back and forth to said coil cases, a series of cores on said moving plate, extending into and out of said coil cases, a rotary frame engaging with said moving plate to move and control said moving plate, and a series of pushbuttons with arms capable of rotating said rotary frame, eleastic material positioned between the arms of said pushbuttons and the rear wall of said machine frame to maintain such a condition that said pushbutton arms are always pushed to the front of said machine frame, a sliding member on said arms, a pivoting channeling plate engaging with said rotary frame on said arms, and relatively strong elastic material and relatively weak elastic material on said channeling plate, said relatively strong elastic material being acted by a pressing shaft provided on said sliding member and a hole in the center of said relatively weak elastic material and forming a check portion which is turned at the checked portion and checks the pivot portion of said channeling plate at one side.

16. A pushbutton tuner claimed in claim 15, including insertion holes in said arms, sliding member, weak elastic material and strong elastic material, a stepped stopper in said holes for combination, holding the center of said arms between upper and lower fitting portions at the end portions of said sliding member, and a pressed shaft rotatatably mounted between said portions, so that a pressure portion formed at the end portion of said strong elastic material is engaged and pressed with said pressing shaft.

17. A pushbutton tuner claimed in claim 15, including a pressing projection near the inserting hole for said stepped stopper which is formed in said weak elastic material, and a tongue having a portion at the front near said pressing projection which presses said channeling plate and which projects from the side of said elastic material.

18. A pushbutton tuner claimed in claim 15 wherein the weak elastic material at the center punched hole, a U-shape part corresponding to said punched hole to provide a fitting projection, a fitting portion at the end of said fitting projection, and an opening in said arms and said sliding member holding said fitting projection so that said fitting projection can be mounted and dismounted in said opening.

19. A pushbutton tuner, comprising a machine consisting of four side walls in coil cases mounted on said machine frame, coils in said coil cases, a plurality of guide means for said coil cases, a moving plate slideably mounted on said guide means for being moved back and forth relative to said coil cases, a series of cores on said moving plate positioned for moving into and out of said coil cases, a rotary frame engaged with said moving plate for moving and controlling said plates and a series of pushbuttons with arms capable of rotating said rotary frame, elastic material positioned between the arm on said pushbuttons and the rear wall of said machine frame for maintaining such a condition that said pushbutton arms are always pushed to the front of said machine frame, a sliding member on said arms, and an L-shaped mouth in the side of said sliding member at the tail end thereof.

20. A pushbutton tuner claimed in claim 19 including contacting portion with a narrow extension having an L-shaped mouth, said contacting portion extending obliquely to appropriately protude from the side of said sliding member, providing an oblique portion to the basic side in the end portion of said contacting portion, and said oblique portion extending in said mouth when the end portion of said sliding member is inserted in the hole of the said pushbuttons.

21. A pushbutton turner claimed in claim 20 including a receiving portion for said sliding member adjacent a guide groove for the arms in said pushbuttons, and projection having a fitting step at the inner part continuous to a contacting portion of said sliding member and the oblique face contacting to the oblique portion.

22. A pushbutton tuner claimed in claim 21 wherein the distance between the end of the inserting hole of said pushbutton and the fitting portion is at least equal to the width of said L-shaped mouth.

23. A pushbutton tuner, comprising a machine frame consisting of four side walls, coil cases mounted on said machine frame, coils in said coil cases, a plurality of guide means for said coil cases, a moving plate slideably mounted on said guide means for moving back and forth relative to said coil cases, a series of cores on said moving plate for extending into and out of said coil cases, a rotary frame engaged with said moving plate to move and control this plate, and a series of pushbuttons with arms capable of rotating said frame, and upper plate on said coil case, and a stroke controlling piece on one side of said upper plate, which controls strokes of said cores moving into and out of said coil cases, and a rectangular hole in said stroke controlling piece, a projection to be mounted in said hole, and a stopper which is inserted in said hole adjacent to said projection and which presses said strokes controlling piece with its head portion to effect fixture.

24. A pushbutton tuner claimed in claim 23, including a bent part in one side of said stroke controlling piece, and a spring positioned between a projection of said bent part and the rear wall of said machine frame so that said stroke controlling piece always takes a projecting action to the front side of said machine frame.

* * * * *